US012643153B2

(12) United States Patent
Sasaki et al.

(10) Patent No.: US 12,643,153 B2
(45) Date of Patent: Jun. 2, 2026

(54) CUTTING TOOL

(71) Applicant: TUNGALOY CORPORATION, Fukushima (JP)

(72) Inventors: Ryou Sasaki, Iwaki (JP); Ryuichi Saji, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 309 days.

(21) Appl. No.: 18/628,942

(22) Filed: Apr. 8, 2024

(65) Prior Publication Data

US 2024/0351111 A1 Oct. 24, 2024

(30) Foreign Application Priority Data

Apr. 20, 2023 (JP) ................................. 2023-069142

(51) Int. Cl.
| | |
|---|---|
| *B23B 27/00* | (2006.01) |
| *B23B 27/16* | (2006.01) |

(52) U.S. Cl.
CPC ........ B23B 27/007 (2013.01); B23B 27/1662 (2013.01); *B23B 2200/3618* (2013.01)

(58) Field of Classification Search
CPC ... B23B 27/007; B23B 27/00; B23B 27/1662; B23B 27/16; B23B 27/14; B23B 2200/3618; B23B 2200/36; B23B 2200/00; B23B 51/08; B23B 51/00; B23B 51/0007; B23B 51/0006; B23B 2251/00; B23B 2251/08; B23B 2251/40
USPC ............... 483/21, 102, 40, 47, 103, 48, 104; 30/329; 29/40; 407/66, 15, 25, 33
See application file for complete search history.

(56) References Cited

U.S. PATENT DOCUMENTS

| | | | | |
|---|---|---|---|---|
| 5,779,400 | A * | 7/1998 | Fountaine | ........... B23B 27/1614 |
| | | | | 407/103 |
| 7,632,050 | B2 * | 12/2009 | Nuzzi | ..................... B23B 51/08 |
| | | | | 408/227 |
| 9,308,587 | B2 * | 4/2016 | Kitagawa | .............. B23B 27/007 |
| 9,751,180 | B2 * | 9/2017 | Jayr | ....................... G01L 5/1627 |
| 10,124,412 | B2 * | 11/2018 | Harif | ...................... B23B 51/00 |
| 10,654,116 | B2 * | 5/2020 | Kawasaki | .............. B23B 29/22 |
| 10,882,115 | B2 * | 1/2021 | Harif | ...................... B30B 11/02 |
| 11,453,062 | B2 * | 9/2022 | Harif | ...................... B23C 5/202 |

(Continued)

FOREIGN PATENT DOCUMENTS

| | | |
|---|---|---|
| JP | S59-046614 U | 3/1984 |
| JP | 2019-155559 A | 9/2019 |

*Primary Examiner* — Lawrence Averick
(74) *Attorney, Agent, or Firm* — Studebaker Brackett PLLC

(57) ABSTRACT

A cutting tool with sufficient stiffness of a body is provided. A cutting tool 10 includes a body 100 in which a discharge groove 120 for guiding and discharging chips is formed, and a cutting insert 200 fastened and fixed on a distal end side of the body 100. The cutting insert 200 includes a first surface 210 through which a through-hole 230 is opened, and a major cutting edge 231 formed so as to extend straight at an end part of the first surface 210. A protrusion portion 130 protruding so as to cover part of the first surface 210 of the cutting insert 200 from outside is formed at the body 100. A clearance hole 170 is formed so as to extend from a surface of the body 100 opposite the cutting insert 200 toward a corner cutting edge 242 when viewed from the distal end side along a central axis AX1.

4 Claims, 9 Drawing Sheets

(56)           References Cited

U.S. PATENT DOCUMENTS

| | | | |
|---|---|---|---|
| 11,583,943 B2 * | 2/2023 | Aso | B23C 5/109 |
| 12,090,558 B2 * | 9/2024 | Suzuki | B23B 27/141 |
| 12,337,391 B2 * | 6/2025 | Nagata | B23B 1/00 |
| 2006/0222469 A1 * | 10/2006 | Nuzzi | B23B 51/00 |
| | | | 408/224 |
| 2010/0067994 A1 * | 3/2010 | Nuzzi | B23B 51/107 |
| | | | 408/145 |
| 2011/0206472 A1 * | 8/2011 | Nuzzi | B23B 51/00 |
| | | | 408/1 R |
| 2011/0243674 A1 * | 10/2011 | Kitagawa | B23B 27/007 |
| | | | 408/199 |
| 2012/0237305 A1 * | 9/2012 | Lee | B23B 51/00 |
| | | | 408/238 |
| 2013/0089383 A1 * | 4/2013 | Nuzzi | B23B 51/107 |
| | | | 408/200 |
| 2016/0045994 A1 * | 2/2016 | Jayr | B23Q 17/0966 |
| | | | 407/66 |
| 2016/0368061 A1 * | 12/2016 | Harif | B23C 5/283 |
| 2019/0047054 A1 * | 2/2019 | Harif | B30B 11/02 |
| 2019/0118273 A1 * | 4/2019 | Kawasaki | B23B 29/22 |
| 2019/0283142 A1 | 9/2019 | Suzuki et al. | |
| 2020/0139448 A1 * | 5/2020 | Harif | B30B 11/02 |
| 2022/0105577 A1 * | 4/2022 | Aso | B23C 5/109 |
| 2022/0274184 A1 * | 9/2022 | Suzuki | B23B 27/1607 |
| 2023/0059599 A1 * | 2/2023 | Harif | B30B 15/022 |
| 2023/0347418 A1 * | 11/2023 | Nagata | B23B 27/141 |

* cited by examiner

PROXIMAL
END SIDE

DISTAL END SIDE

PROXIMAL END SIDE

DISTAL END SIDE

CUTTING TOOL

BACKGROUND OF THE INVENTION

Field of the Invention

The present invention relates to a cutting tool.

Description of the Related Art

A cutting tool capable of performing both turning and drilling has been known, such as a cutting tool disclosed in Japanese Patent Laid-open No. 2019-155559 described below. The cutting tool includes a body in which a discharge groove for guiding and discharging chips is formed, and a cutting insert fastened and fixed on a distal end side of the body.

SUMMARY OF THE INVENTION

A cutting edge provided at the cutting insert to enable drilling needs to have a length approximately equal to the radius of a hole formed through drilling. Specifically, when viewed along the central axis of the body, the cutting edge needs to extend outward from the central axis at least up to a position of a length approximately equal to the hole radius.

In a cutting tool used in small-diameter drilling, the size of the cutting insert is smaller as the cutting edge is shorter. However, in a case where the size of the cutting insert is too small, it is difficult to ensure strength enough to withstand fastening and fixation to the body. To avoid this difficulty, a cutting insert including a cutting edge longer than the hole radius can be attached to the body. In this case, the cutting edge extends from the outer periphery side of the body to a position over the central axis of the body when viewed along the central axis of the body, and only part of the cutting edge is used for cutting.

However, such a configuration may lead to a problem that part of a portion of the body where the cutting insert is held is too thin and the stiffness of the body decreases.

The present invention is intended to provide a cutting tool with sufficient stiffness of a body.

A cutting tool according to the present invention includes a body in which a discharge groove for guiding and discharging chips is formed so as to extend from a distal end side toward a proximal end side, and a cutting insert fastened and fixed on the distal end side of the body. The cutting insert includes a first surface through which a through-hole for inserting a fastening member is opened, a second surface that is surface opposite the first surface and contacts an insert seat of the body, and a major cutting edge that is formed so as to extend straight at an end part of the first surface and at least part of which is used for cutting. The cutting insert is fastened and fixed to the body by the fastening member such that the first surface faces inward of the discharge groove and the major cutting edge protrudes on the distal end side of a distal end of the body. A protrusion portion protruding so as to cover part of the first surface of the cutting insert from outside is formed at the body. The cutting insert includes a first corner cutting edge connected to an outer periphery side end part of the major cutting edge, and a second corner cutting edge positioned opposite the first corner cutting edge along a diagonal line of the first surface. The second corner cutting edge is covered by the protrusion portion. A clearance hole for preventing contact with the second corner cutting edge is formed in the body. The clearance hole is formed so as to extend from a surface of the body opposite the cutting insert toward the second corner cutting edge when viewed from the distal end side along a central axis of the body.

In the body of the cutting tool having the above-described configuration, the protrusion portion protruding from an inner surface of the discharge groove is formed so as to cover part of the first surface of the cutting insert from outside.

For example, in a case where the major cutting edge of the cutting insert is disposed extending from an outer periphery side of the body to a position over the central axis of the body, in other words, in a case where the length of the major cutting edge is longer than the hole radius, the vicinity of the portion of the body where the cutting insert is provided becomes thin along with increase in the size of the cutting insert and the stiffness of the body potentially decreases. However, even in such a case, the body of the cutting tool having the above-described configuration is thick due to presence of the protrusion portion, and thus the stiffness of the body does not become too low along with increase in the size of the cutting insert.

Moreover, the clearance hole is formed in the body to prevent contact with the second corner cutting edge provided at the cutting insert. The clearance hole is formed so as to extend from the surface of the body opposite the cutting insert toward the second corner cutting edge when viewed from the distal end side along the central axis of the body. With such a configuration, the second moment of area of the body does not become too small along with formation of the clearance hole. Accordingly, the body can ensure sufficient stiffness as well as can prevent contact with the second corner cutting edge because of the clearance hole.

In a more preferable aspect, the major cutting edge may extend from the outer periphery side of the body to a position over the central axis of the body when viewed along the central axis of the body.

In a more preferable aspect, the protrusion portion may overlap none of the major cutting edge and the through-hole when viewed along a central axis of the through-hole.

In a more preferable aspect, an angle between a central axis of the clearance hole and the central axis of the body may be 90°±30°, and an angle between the central axis of the clearance hole and the second surface may be 0°±30°.

According to the present invention, a cutting tool with sufficient stiffness of a body is provided.

DETAILED DESCRIPTION OF THE PREFERRED EMBODIMENTS

Figure 1:
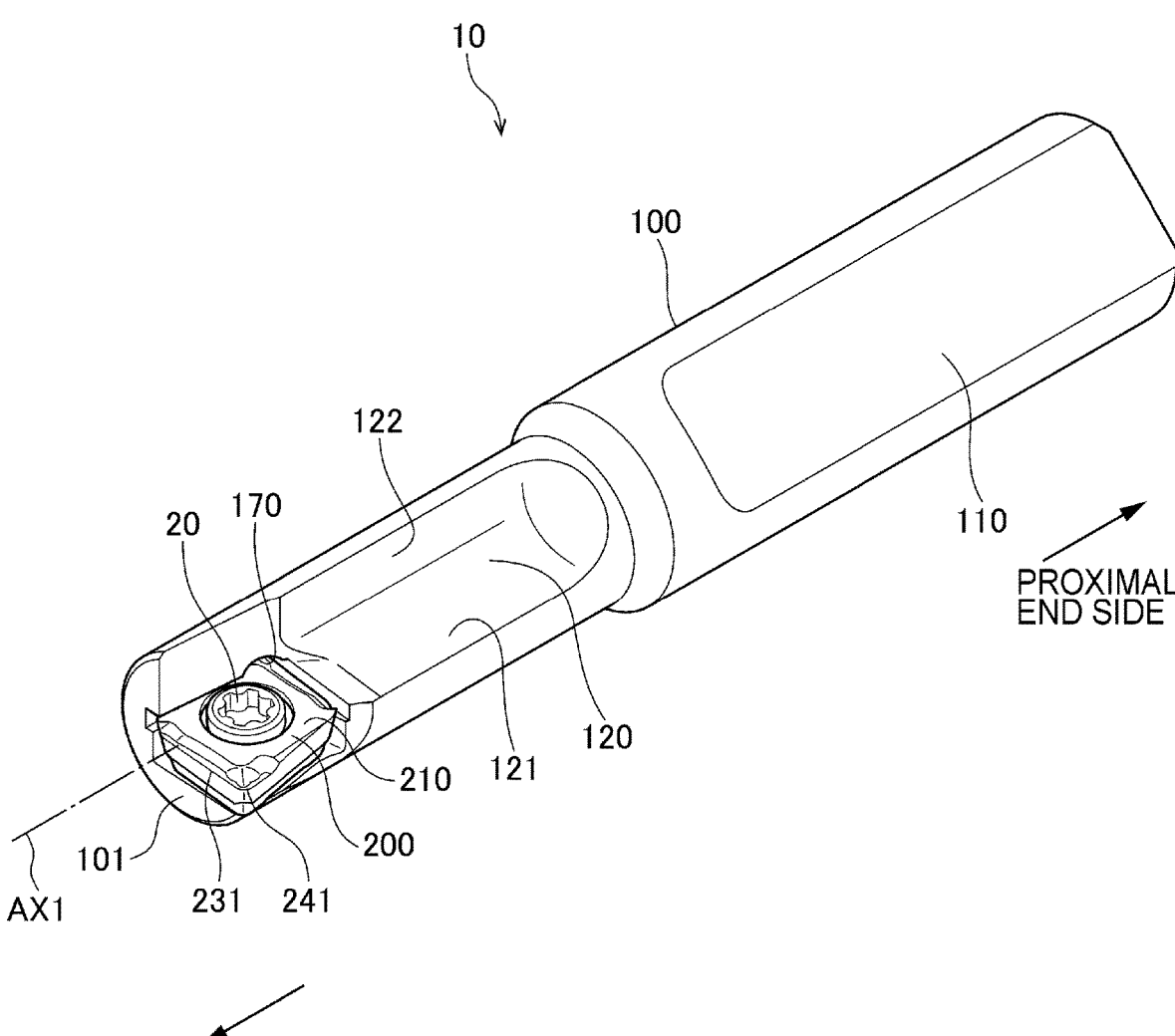
FIG. 1 is a perspective view illustrating the configuration of a cutting tool according to the present embodiment.

The present embodiment will be described below with reference to the accompanying drawings. To facilitate understanding of description, any identical components in the drawings are denoted by the same reference sign as much as possible, and duplicate description thereof is omitted.

A cutting tool 10 according to the present embodiment is configured as a tool capable of performing both turning and drilling. The turning includes fabrication for increasing the inner diameter of an existing hole formed in a cutting target material, fabrication of an end face (bottom surface) of the hole, and the like. The drilling is fabrication for newly forming a circular hole in a cutting target material. The hole formed by the drilling may be a bottomed hole or a through-hole. Such a configuration of the cutting tool 10 is merely exemplary. The cutting tool 10 may be configured as a tool for performing only one of the turning and the drilling. As illustrated in FIG. 1, the cutting tool 10 includes a body 100 and a cutting insert 200.

The body 100 is a member constituting substantially the whole of the cutting tool 10 and formed of steel. The body 100 is a bar member having a substantially cylindrical shape, and the cutting insert 200 to be described later is attached on a distal end side of the body 100. For the purpose of description, an end part side of the body 100 where the cutting insert 200 is attached is also referred to as a "distal end side", and the opposite end part side is also referred to as a "proximal end side" in the following description.

A discharge groove 120 is formed in the body 100. The discharge groove 120 is a groove for guiding and discharging, toward the proximal end side, chips generated while a cutting target material is fabricated. The discharge groove 120 is formed so as to extend straight from the position of the cutting insert 200 toward the proximal end side at the side surface of the body 100. The discharge groove 120 is partitioned by a pair of flat surfaces 121 and 122 and a curved surface connecting the flat surfaces 121 and 122. The angle between the flat surfaces 121 and 122 is preferably in the range of 70° to 120° but may be out of the range.

A straight line denoted by a reference sign "AX1" in FIG. 1 represents the central axis of the body 100. In the following description, the central axis is also referred to as a "central axis AX1". If no discharge groove 120 is formed in the body 100, the body 100 has a circular section when cut in a direction orthogonal to the longitudinal direction. The central axis AX1 is an axis passing through the center of the circle. The sectional shape of the body 100 in a case where no discharge groove 120 is formed may be any shape other than a circular shape. The central axis AX1 in such a case may be set as, for example, an axis passing through the barycenter of the shape.

A flat surface 110 is formed at the side surface of a portion of the body 100 on the proximal end side. The proximal end side portion including the flat surface 110 is a portion grasped and fixed by a non-illustrated working machine and is also referred to as what is called a "shank". The flat surface 110 extends from an end part of the body 100 on the proximal end side to a position in the vicinity of the discharge groove 120.

The cutting insert 200 is a member provided with a major cutting edge 231, a corner cutting edge 241, and the like for cutting and formed of, for example, a hard material. The cutting insert 200 is fastened and fixed to an insert seat (bottom surface 140 to be described later) provided on the distal end side of the body 100 by a fastening member 20. Specific configurations of the insert seat in the body 100 and the vicinity thereof will be described later.

Figure 2:
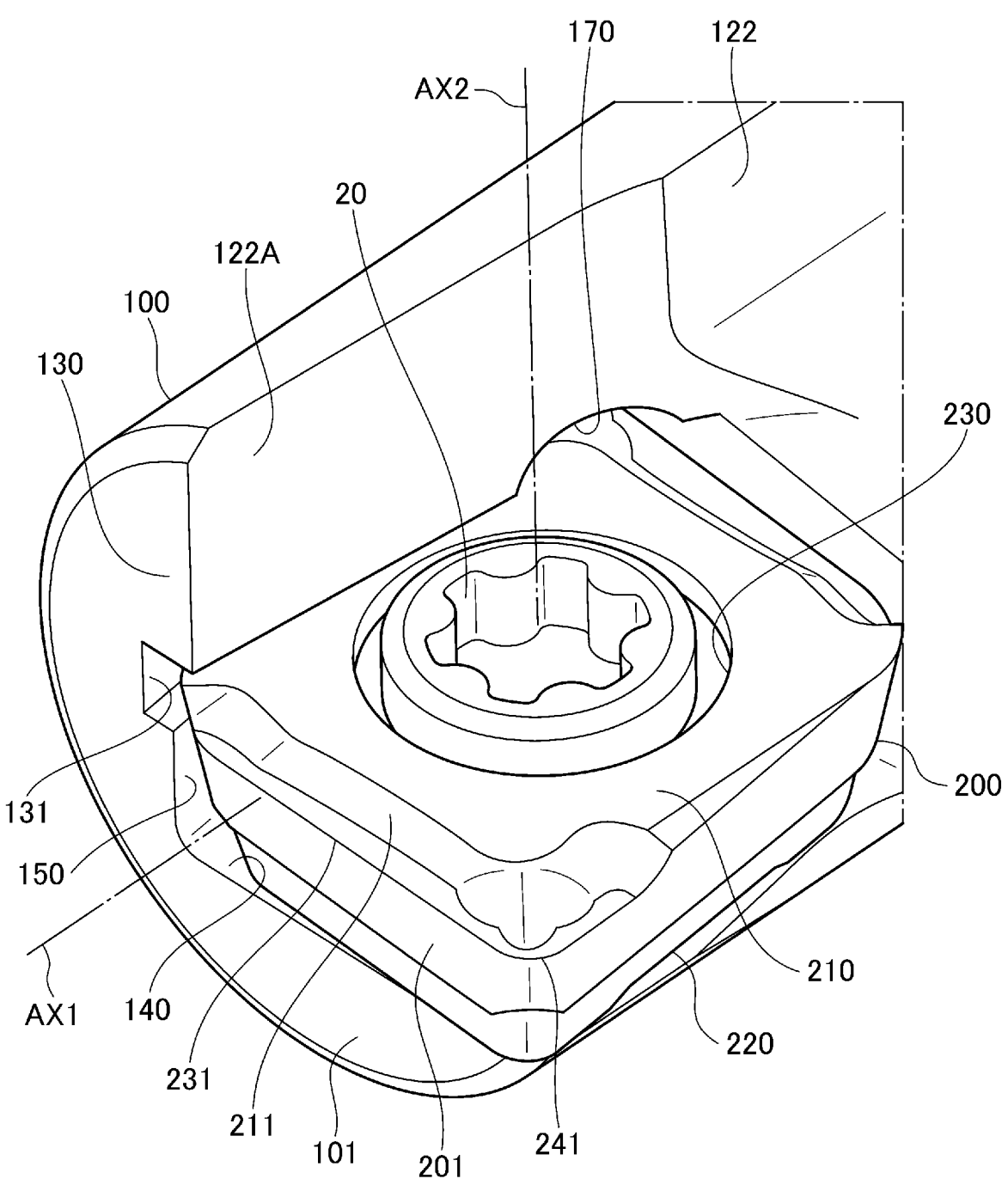
FIG. 2 is an enlarged diagram illustrating part of the cutting tool illustrated in FIG. 1.
Figure 3:
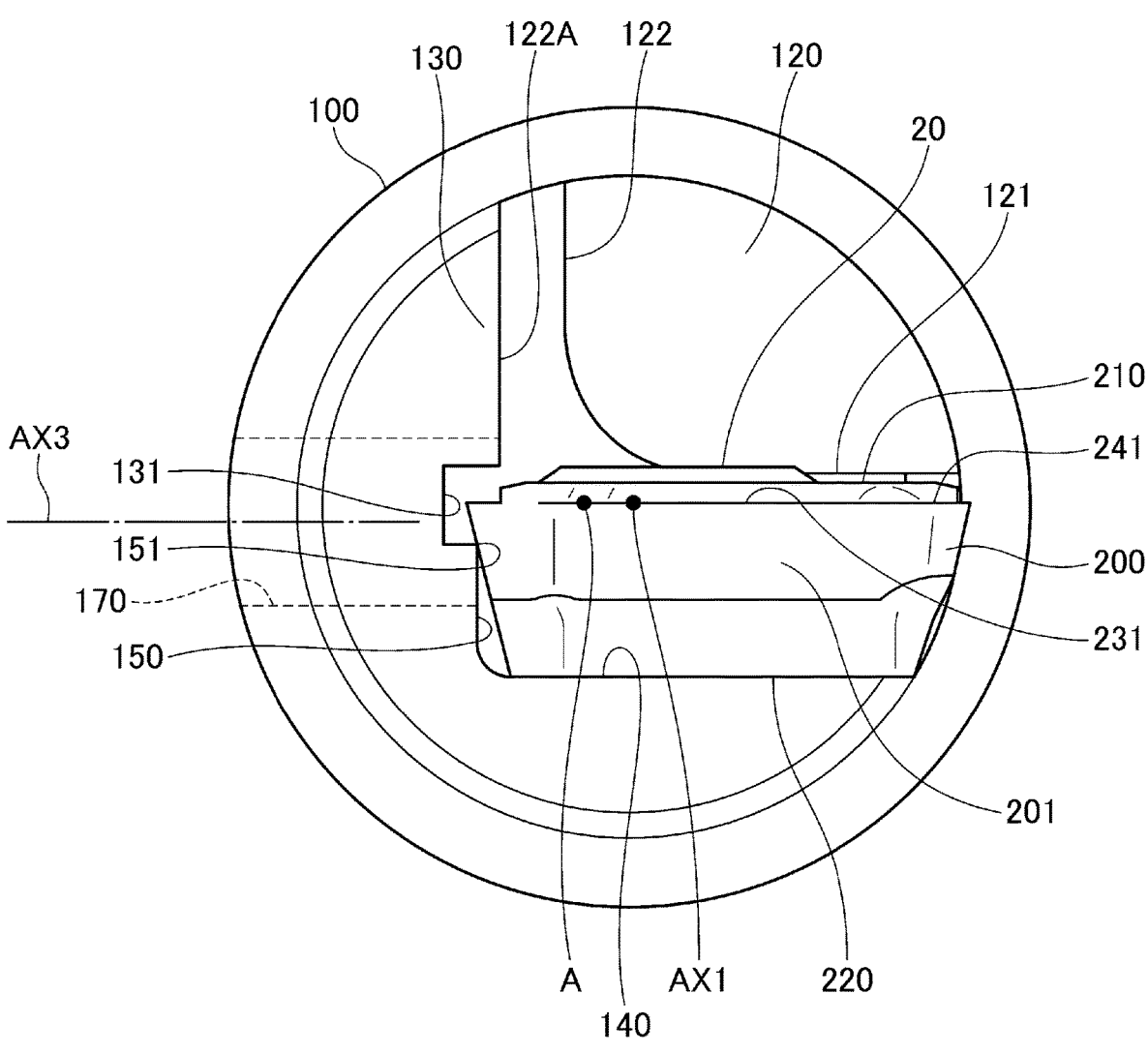
FIG. 3 is a diagram of the cutting tool illustrated in FIG. 1 when viewed in a direction along the central axis of a body.
Figure 4:
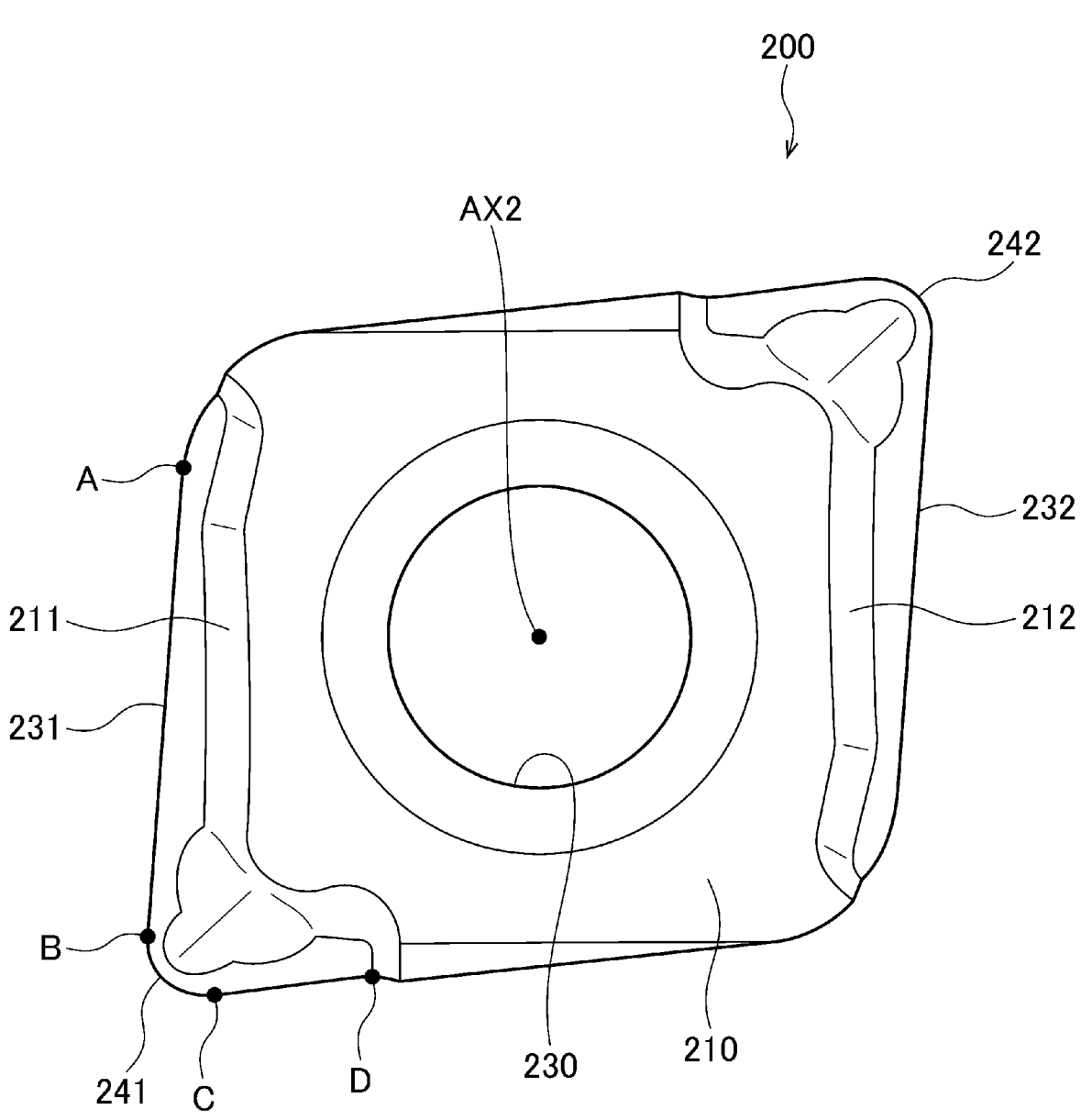
FIG. 4 is a diagram illustrating the configuration of a cutting insert included in the cutting tool according to the present embodiment.

As illustrated in FIGS. 2, 3, and 4, the cutting insert 200 includes a first surface 210, a second surface 220, major cutting edges 231 and 232, and corner cutting edges 241 and 242.

The first surface 210 is a surface facing inward of the discharge groove 120 in a state in which the cutting insert 200 is attached to the body 100. As illustrated in FIG. 1, the first surface 210 is disposed on a plane substantially parallel to the flat surface 121 of the discharge groove 120 and substantially flush with the flat surface 121. In other words, the first surface 210 is a surface partitioning part of the discharge groove 120 together with the flat surface 121. As illustrated in FIG. 4, the first surface 210 has a substantially parallelogram shape.

One end of a through-hole 230 is opened at the first surface 210. The through-hole 230 is a circular through-hole for inserting the fastening member 20. The through-hole 230 penetrates through the cutting insert 200 from the first surface 210 to the second surface 220 to be described next. A central axis AX2 of the through-hole 230 is orthogonal to the first surface 210.

The second surface 220 is a surface that is opposite the first surface 210 and contacts the insert seat (the bottom surface 140; refer to FIGS. 2 and 5) of the body 100. The second surface 220 is a flat surface that is parallel to the first surface 210. The second surface 220 has a substantially parallelogram shape like the first surface 210. However, the second surface 220 is smaller than the first surface 210 because a flank surface 201 and the like are tilted as described later.

The major cutting edges 231 and 232 and the corner cutting edges 241 and 242 are cutting edges used for cutting of a cutting target material. As illustrated in FIG. 4, these cutting edges are provided at end parts of the first surface 210 on the outer periphery side. However, the heights of the major cutting edge 231, the corner cutting edge 241, and the like on the first surface 210 are different from the height of a top surface (part denoted by reference sign "210" in FIG. 2) of the first surface 210 because recessed portions 211 and 212 to be described later are provided.

The major cutting edges 231 and 232 are cutting edges mainly used for the drilling. The major cutting edges 231 and 232 are formed so as to extend straight along a pair of respective facing sides of the first surface 210 in a substantially parallelogram shape. Only one of the major cutting edges 231 and 232 actually functions as a "cutting edge" during fabrication of a cutting target material. Which of the major cutting edges 231 and 232 functions as a "cutting edge" changes depending on the state of attachment of the cutting insert 200 to the body 100. For example, in an attachment state illustrated in, for example, FIG. 2, only the major cutting edge 231 disposed at a position on the distal end side functions as a "cutting edge".

Figure 6:
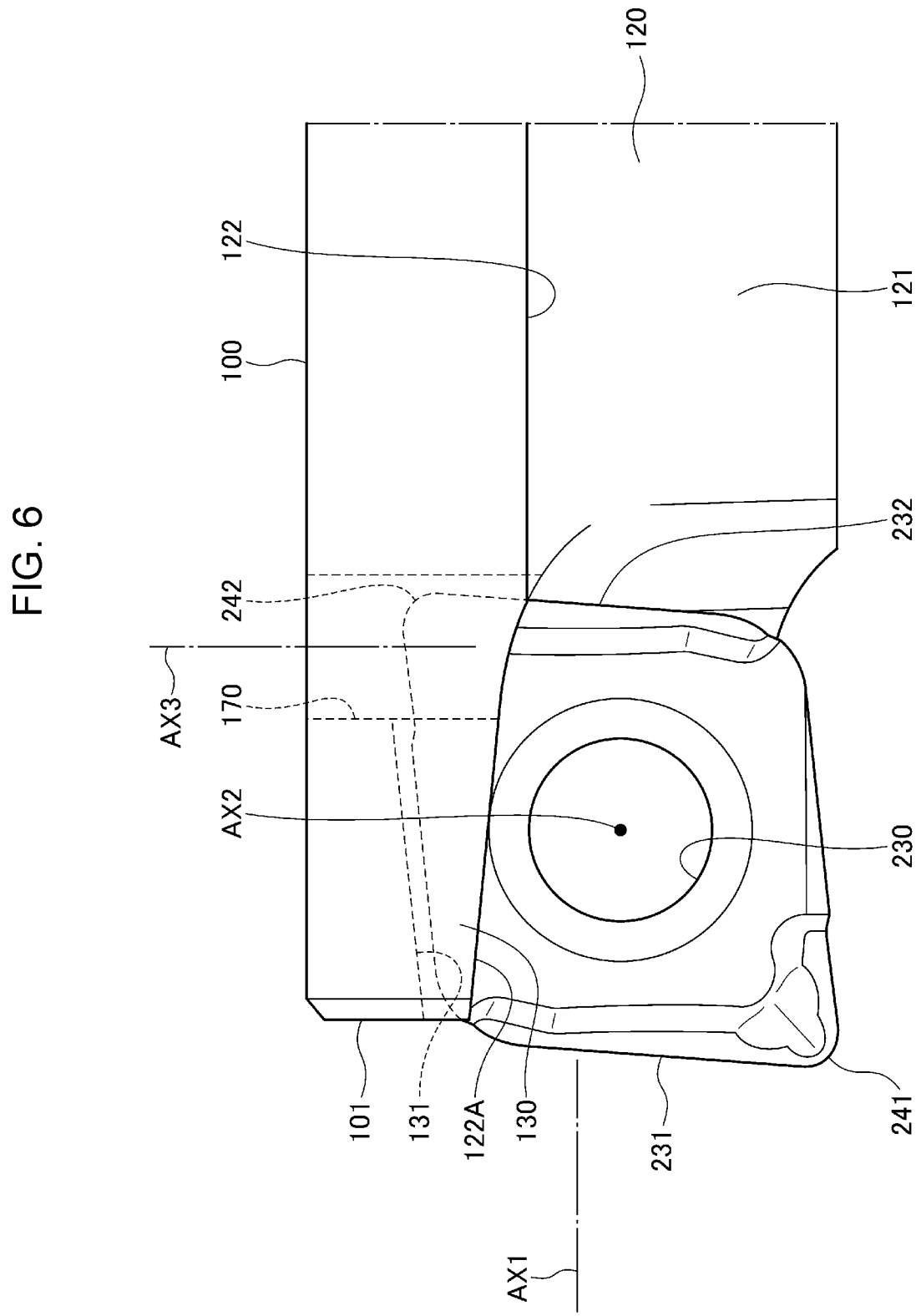
FIG. 6 is a diagram of the cutting tool illustrated in FIG. 2 when viewed in a direction along the central axis of a through-hole of the cutting insert.

As illustrated in FIG. 6, the cutting insert 200 is fastened and fixed to the body 100 by the fastening member 20 such that a major cutting edge (in this example, the major cutting edge 231) used for fabrication protrudes on the distal end side of a distal end surface 101 of the body 100.

The cutting insert 200 has a rotationally symmetric shape so that the major cutting edges 231 and 232 can be used in a switching manner. Specifically, the shape of the cutting insert 200 after the cutting insert 200 is rotated by 180° about the central axis AX2 entirely overlaps the shape of the cutting insert 200 before the rotation.

The major cutting edge 231 is provided in a range from the position of a point A illustrated in FIG. 4 to the position of a point B that is the boundary with the corner cutting edge 241. The major cutting edge 232 is provided in a range corresponding to the above-described range being rotated by 180° about the central axis AX2, and thus illustration and the like are omitted. Although the major cutting edge 231 is provided in the above-described range, only part of the major cutting edge 231 is actually used for cutting in many cases. For example, in the drilling, only a range of the major cutting edge 231 on the right side of the central axis AX1 in FIG. 3 is actually used for cutting in a case where the central axis of a hole is aligned with the central axis AX1. This is the same for the major cutting edge 232.

The corner cutting edges 241 and 242 are cutting edges mainly used for the turning and are each disposed at a corner portion of the first surface 210. In a state in which the cutting insert 200 is attached to the body 100 as illustrated in FIG. 2, the corner cutting edge 241 is connected to an outer periphery side end part of the major cutting edge 231. The corner cutting edge 242 is positioned opposite the corner cutting edge 241 along a diagonal line of the first surface 210. The corner cutting edge 241 corresponds to a "first corner cutting edge" of the present embodiment. The corner cutting edge 242 corresponds to a "second corner cutting edge" of the present embodiment.

The corner cutting edges 241 and 242 are formed so as to extend in curved line shapes along a pair of facing corner portions of the first surface 210 in a substantially parallelo-gram shape. Similarly to the above-described major cutting edges 231 and 232, only one of the corner cutting edges 241 and 242 actually functions as a "cutting edge" during fabrication. For example, in the attachment state illustrated in, for example, FIG. 2, only the corner cutting edge 241 disposed at a position on the distal end side and the outer periphery side functions as a "cutting edge".

The corner cutting edge 241 is provided in a range of a circular arc shape from the position of the point B to the position of a point C in FIG. 4. The corner cutting edge 242 is provided in a range corresponding to the above-described range being rotated by 180° about the central axis AX2, and thus illustration and the like are omitted. In the present embodiment, the portion of the point C to a point D in FIG. 4 is formed as a straight cutting edge.

Other components included in the cutting insert 200 will be described below. As illustrated in FIG. 4, the recessed portion 211 that functions as a chip breaker is formed at a position in the vicinity of the major cutting edge 231 and the corner cutting edge 241 on the first surface 210. Similarly, the recessed portion 212 that functions as a chip breaker is formed at a position in the vicinity of the major cutting edge 232 and the corner cutting edge 242 on the first surface 210.

Surfaces extending from the major cutting edges 231 and 232 and the corner cutting edges 241 and 242, respectively, to the second surface 220 are surfaces provided as what is called a "flank surface". The surfaces are not orthogonal to the second surface 220 but are tilted relative to the second surface 220. For example, the flank surface 201 disposed on the distal end side in FIG. 2 is tilted relative to the second surface 220 such that the flank surface 201 is closer to the proximal end side as the position moves from the first surface 210 to the second surface 220 side. Specifically, the flank surface 201 is tilted such that the internal angle between the flank surface 201 and the first surface 210 intersecting each other is an acute angle and the internal angle between the flank surface 201 and the second surface 220 intersecting each other is an obtuse angle. This is the same for other flank surfaces connected to the major cutting edge 232 and the corner cutting edges 241 and 242.

In a case where any of the turning and the drilling is performed, fabrication is performed by applying a cutting edge of the cutting tool 10 to a cutting target material while rotating the cutting target material. In this case, the rotation center axis of the cutting target material is aligned with the central axis AX1 of the body 100. Instead of such an aspect, fabrication may be performed while the cutting tool 10 is rotated about the central axis AX1.

As illustrated in FIG. 3, when the cutting tool 10 is viewed along the central axis AX1 of the body 100, the point A indicating an end part of the major cutting edge 231 is positioned on the left side of the central axis AX1 in FIG. 3. Specifically, the major cutting edge 231 of the present embodiment extend from the outer periphery side (right side in the example illustrated in FIG. 3) of the body 100 to a position over the central axis AX1.

In a case where the drilling is performed while a cutting target material or the cutting tool 10 is rotated about the central axis AX1 as described above, the major cutting edge 231 needs to extend at least up to the position of the central axis AX1 so that the drilling can be performed.

Thus, the cutting insert 200 can be downsized such that the major cutting edge 231 has a minimum necessary length (that is, a length approximately equal to the radius of a hole). However, if the cutting insert 200 is downsized as described above in a cutting tool for forming a small-diameter hole, the ratio of occupation of the first surface 210 by the through-hole 230 is too large and it is difficult to ensure strength of the cutting insert 200 enough to withstand fastening and fixation to the body 100. Thus, in the cutting tool 10 according to the present embodiment, the major cutting edge 231 is longer than the hole radius such that the cutting insert 200 has a size larger than a minimum size necessary for small-diameter drilling. Accordingly, the strength of the cutting insert 200 is sufficiently ensured.

In a case where the cutting insert 200 has sufficient strength, the point A indicating the end part of the major cutting edge 231 may be positioned at the central axis AX1. In other words, the major cutting edge 231 may extend from the outer periphery side of the body 100 to the position of the central axis AX1 only.

Figure 5:
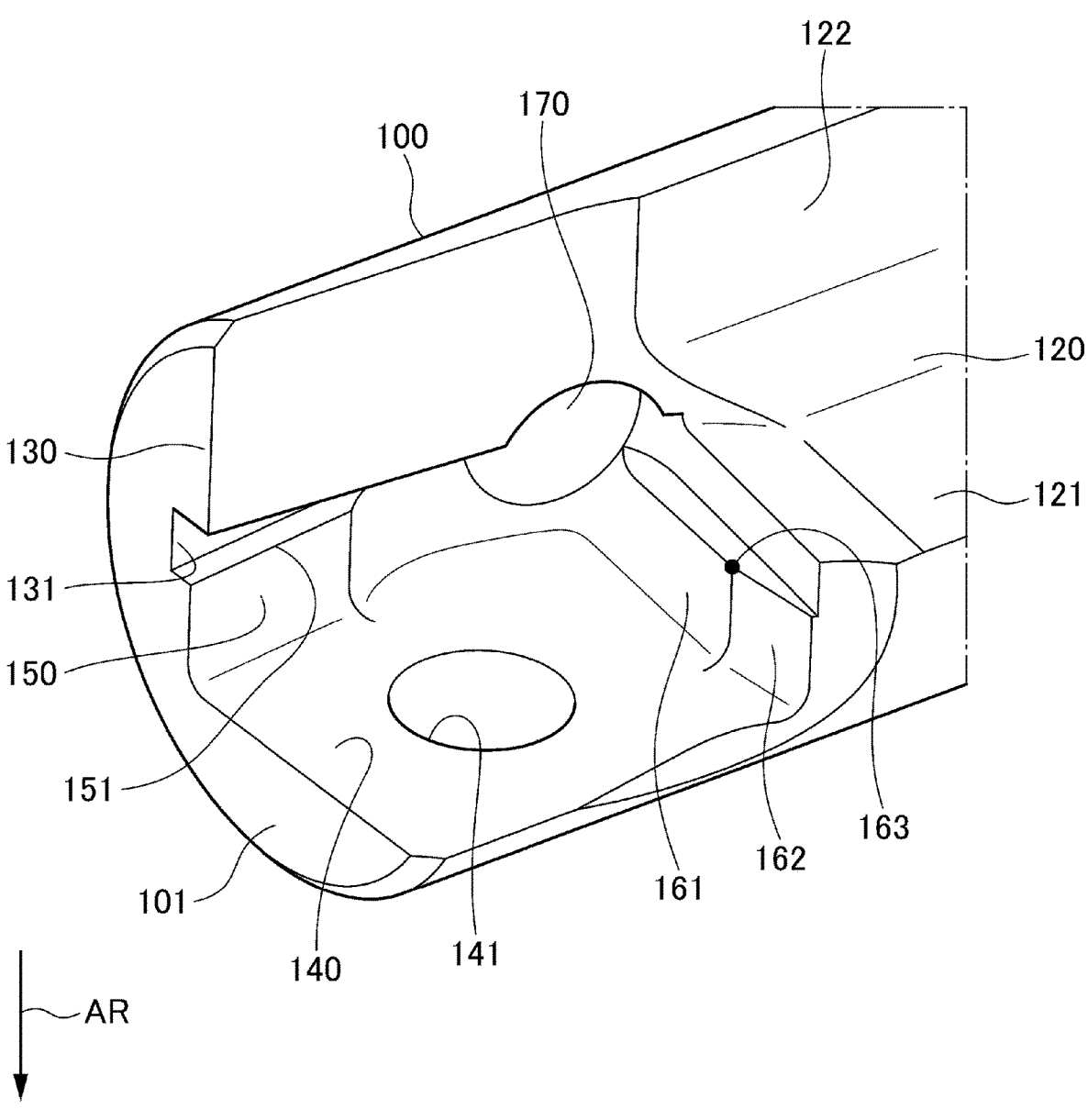
FIG. 5 is a diagram illustrating the cutting tool illustrated in FIG. 2 in a state in which the cutting insert is removed from the body.

A specific configuration of a portion of the body 100 in the vicinity of the cutting insert 200 will be described below. FIG. 5 illustrates a perspective view of the body 100 from which the cutting insert 200 is removed. As illustrated in the drawing, a recessed portion for fitting the cutting insert 200 is formed at a distal end side portion of the body 100, and the bottom surface 140 of the recessed portion constitutes part of the insert seat. The bottom surface 140 is a surface parallel to the flat surface 121. The above-described recessed portion is partitioned by, for example, surfaces 150, 161, and 162 in addition to the bottom surface 140. One end of a through-hole 141 is opened at the bottom surface 140. The through-hole 141 is a hole into which the fastening member 20 for fixing the cutting insert 200 is inserted. A non-illustrated female screw for screwing with the fastening member 20 is formed at the inner surface of the through-hole 141.

The surface 150 is a surface constituting the insert seat together with the bottom surface 140 and parallel to the flat surface 122. As illustrated in, for example, FIG. 3, the height dimension (dimension in the up-down direction in FIG. 3) of the surface 150 is smaller than the height dimension of the cutting insert 200. The surface 150 contacts a side surface of the cutting insert 200 only on a side 151 opposite the bottom surface 140 and restricts the position of the cutting insert 200 in the right-left direction in FIG. 3.

The surfaces 161 and 162 are surfaces formed so as to extend from an end part of the bottom surface 140 on the proximal end side toward the upper side in FIG. 3. As illustrated in FIG. 5, these surfaces intersect each other at an obtuse angle and a straight line indicating the boundary between the surfaces slightly protrudes toward the cutting insert 200. The boundary between the surfaces 161 and 162 contacts the side surface of the cutting insert 200 only at a point 163 at an end part opposite the bottom surface 140 and restricts the position of the cutting insert 200 in the direction of the central axis AX1.

As illustrated in, for example, FIGS. 3 and 5, a protrusion portion 130 is formed at a distal end portion of the body 100. The protrusion portion 130 is a distal end side portion of a surface partitioning the discharge groove 120 and protrudes further on the right side in FIG. 3 than the surface 150 and a recessed portion 131 to be described later. As illustrated in, for example, FIG. 2, a distal end surface 122A in a direction in which the protrusion portion 130 protrudes is connected to the flat surface 122 on the proximal end side. As illustrated in FIG. 3, the distal end surface 122A of the protrusion portion 130 protrudes to a position on the central axis AX1 side (right side in FIG. 3) of the surface 150 restricting the cutting insert 200. As illustrated in FIG. 6, the surface 122A is tilted relative to the central axis AX1 such that the surface 122A approaches the central axis AX1 as the position moves toward the proximal end side. Since the surface 122A is tilted in this manner, chips generated at the major cutting edge 231 or the like can be smoothly guided to the discharge groove 120 on the proximal end side.

The recessed portion 131 is formed between the surface 150 and the protrusion portion 130. The recessed portion 131 is retracted toward a side (the left side in FIG. 3) opposite the central axis AX1. The recessed portion 131 houses part of the cutting insert 200.

Since the body 100 is provided with the protrusion portion 130, part of the first surface 210 of the cutting insert 200 is covered from outside (from the upper side in FIG. 3) by the protrusion portion 130. As described above, the protrusion portion 130 protruding so as to cover part of the first surface 210 of the cutting insert 200 from outside is formed in the body 100 of the present embodiment.

An effect of providing the protrusion portion 130 in the body 100 will be described below. As described above, since the major cutting edge 231 is longer than the hole radius in the cutting tool 10 according to the present embodiment, the size of the cutting insert 200 is larger than a minimum size necessary for small-diameter drilling so that the strength of the cutting insert 200 is ensured. If the protrusion portion 130 is not provided in the body 100 in such a configuration, the thickness (dimension L in FIG. 9) of the body 100 at a distal end side portion of the flat surface 122 is too small as in a comparative example illustrated in FIG. 9, and accordingly, the stiffness of the body 100 potentially cannot be sufficiently ensured.

Figure 9:
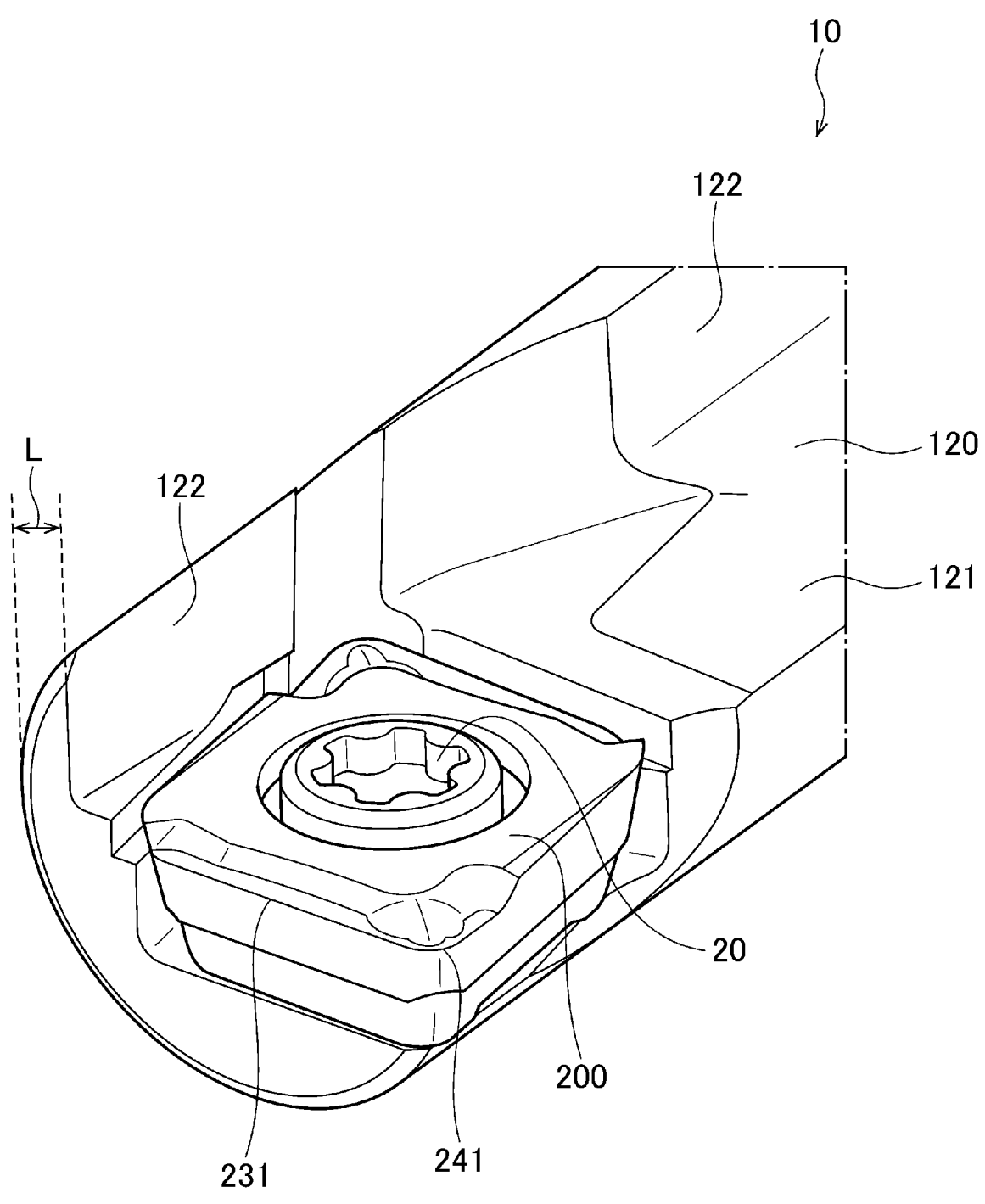
FIG. 9 is a diagram illustrating the configuration of a cutting tool according to a comparative example.

Thus, the protrusion portion 130 is provided in the body 100 of the cutting tool 10 according to the present embodiment to increase the thickness of a portion corresponding to the dimension L in FIG. 9. Accordingly, the stiffness of the body 100 is sufficiently ensured although the body 100 has a configuration for holding the cutting insert 200 of a relatively large size. Such a configuration can be employed for a configuration in which the major cutting edge 231 only has a length approximately equal to the hole radius.

The amount of protrusion of the protrusion portion 130 can be set as appropriate with taken into consideration, for example, deflection allowed for the body 100 during fabrication. However, the amount of protrusion of the protrusion portion 130 is preferably set such that the protrusion portion 130 does not overlap the major cutting edge 231 nor the through-hole 230 when the cutting tool 10 is viewed along the central axis AX2 of the through-hole 230 as illustrated in FIG. 6. Since the protrusion portion 130 does not overlap the major cutting edge 231, it is possible to prevent occurrence of interference with fabrication. Moreover, since the protrusion portion 130 does not overlap the through-hole 230, it is possible to prevent occurrence of interference with work of fastening and fixing the cutting insert 200.

As described above, the cutting insert 200 includes the pair of corner cutting edges 241 and 242. As illustrated in FIG. 6, the corner cutting edge 242, which is not used for fabrication, is entirely covered from outside by the protrusion portion 130. In other words, the corner cutting edge 242 entirely overlaps the protrusion portion 130 when the cutting tool 10 is viewed along the central axis AX2 of the through-hole 230. Since the corner cutting edge 242 is covered by the protrusion portion 130, chips are unlikely to reach the corner cutting edge 242 during fabrication. Accordingly, flaw, damage, and the like of the corner cutting edge 242 are prevented.

As illustrated in, for example, FIGS. 3, 5, and 6, a clearance hole 170 is formed in the body 100. When viewed from the distal end side along the central axis AX1, the clearance hole 170 is a circular hole formed so as to extend from a surface of the body 100 (surface on the left side in FIG. 3) opposite the cutting insert 200 toward the corner cutting edge 242. In FIG. 3, for example, a central axis AX3 of the clearance hole 170 is illustrated. The central axis AX3 is a straight axis orthogonal to the central axis AX1 of the body 100 and parallel to the second surface 220.

When viewed along the central axis AX3, the corner cutting edge 242 of the cutting insert 200 is entirely included inside the clearance hole 170. Specifically, the clearance hole 170 is formed as if a portion of the body 100 in the vicinity of the corner cutting edge 242 is removed. As a result, the corner cutting edge 242 of the cutting insert 200 is entirely disposed in the space of the clearance hole 170 and does not contact the body 100 at all. The clearance hole 170 is formed as a hole for preventing the body 100 from contacting the corner cutting edge 242.

The clearance hole 170 can be formed so as to extend in a direction different from the above-described direction. For example, the clearance hole 170 can be formed so as to extend from a portion of the body 100 on the upper side or the lower side in FIG. 3 toward the corner cutting edge 242 such that the central axis AX3 is orthogonal to the second surface 220.

However, consideration of bending stiffness when the distal end side of the body 100 is bent, for example, in the direction of an arrow AR in FIG. 5 indicates that the bending stiffness is smaller in a case where the central axis AX3 of the clearance hole 170 is orthogonal to the second surface 220 than in a case where the central axis AX3 is parallel to the second surface 220 as in the present embodiment. This is thought to be because the distance of each component of the clearance hole 170 from the centroid is longer and the second moment of area is smaller in a case where the clearance hole 170 is formed such that the central axis AX3 is orthogonal to the second surface 220.

However, in a case where the central axis AX3 is parallel to the second surface 220 as in the present embodiment, the distance of each component of the clearance hole 170 from the centroid is shorter and the second moment of area is larger. Thus, decrease of the second moment of area along with formation of the clearance hole 170 can be reduced in a case where the clearance hole 170 is formed as in the present embodiment. As a result, the stiffness of the body 100 can be increased. To obtain such an effect, the central axis AX3 of the clearance hole 170 does not necessarily need to be completely orthogonal to the central axis AX1 of the body 100 nor completely parallel to the second surface 220. The angle between the central axis AX3 of the clearance hole 170 and the central axis AX1 of the body 100 only needs to be 90°±30°. In addition, the angle between the central axis AX3 of the clearance hole 170 and the second surface 220 only needs to be 0°±30°.

Figure 7:
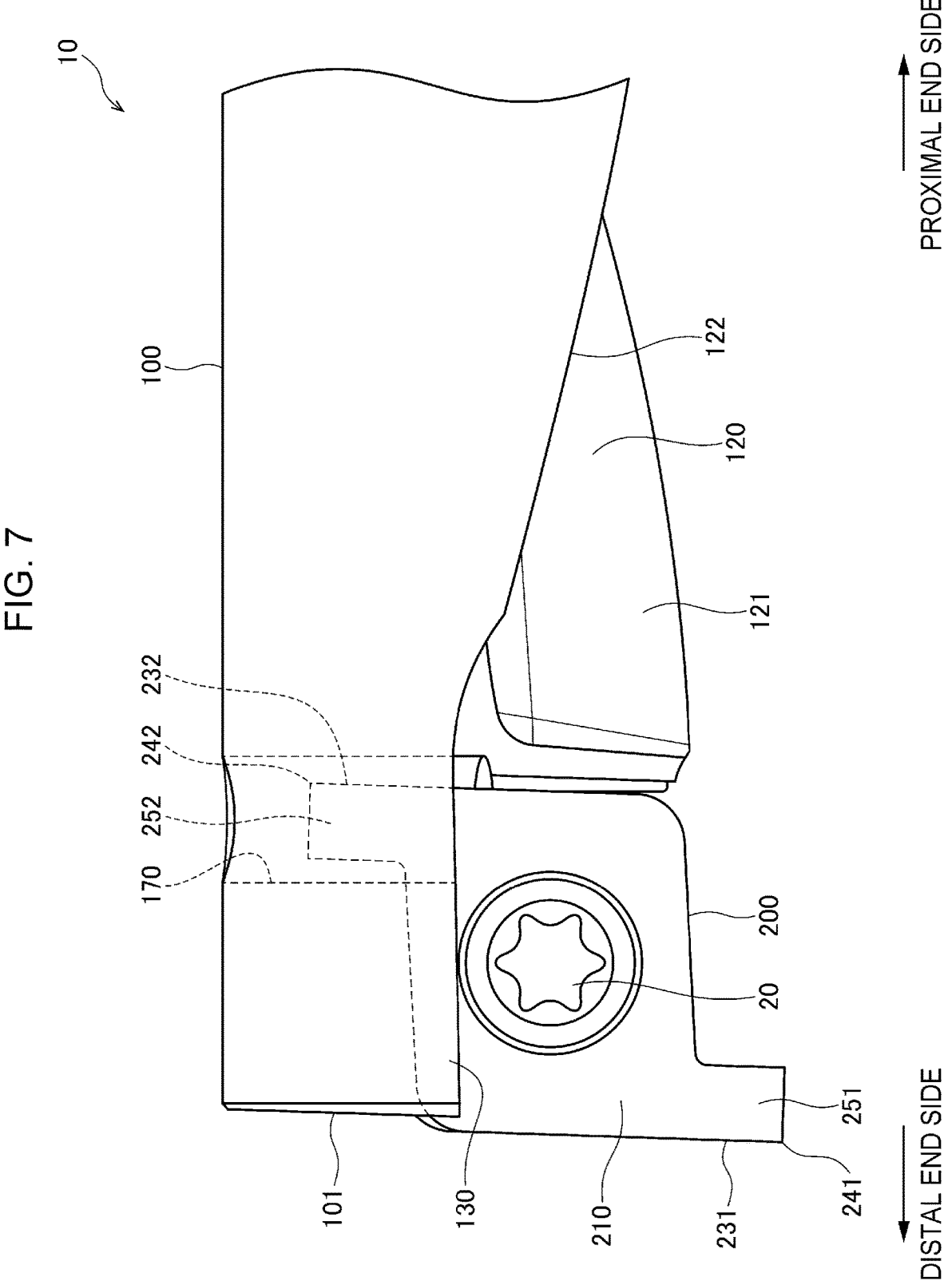
FIG. 7 is a diagram illustrating the configuration of a cutting tool according to a modification of the present embodiment.
Figure 8:
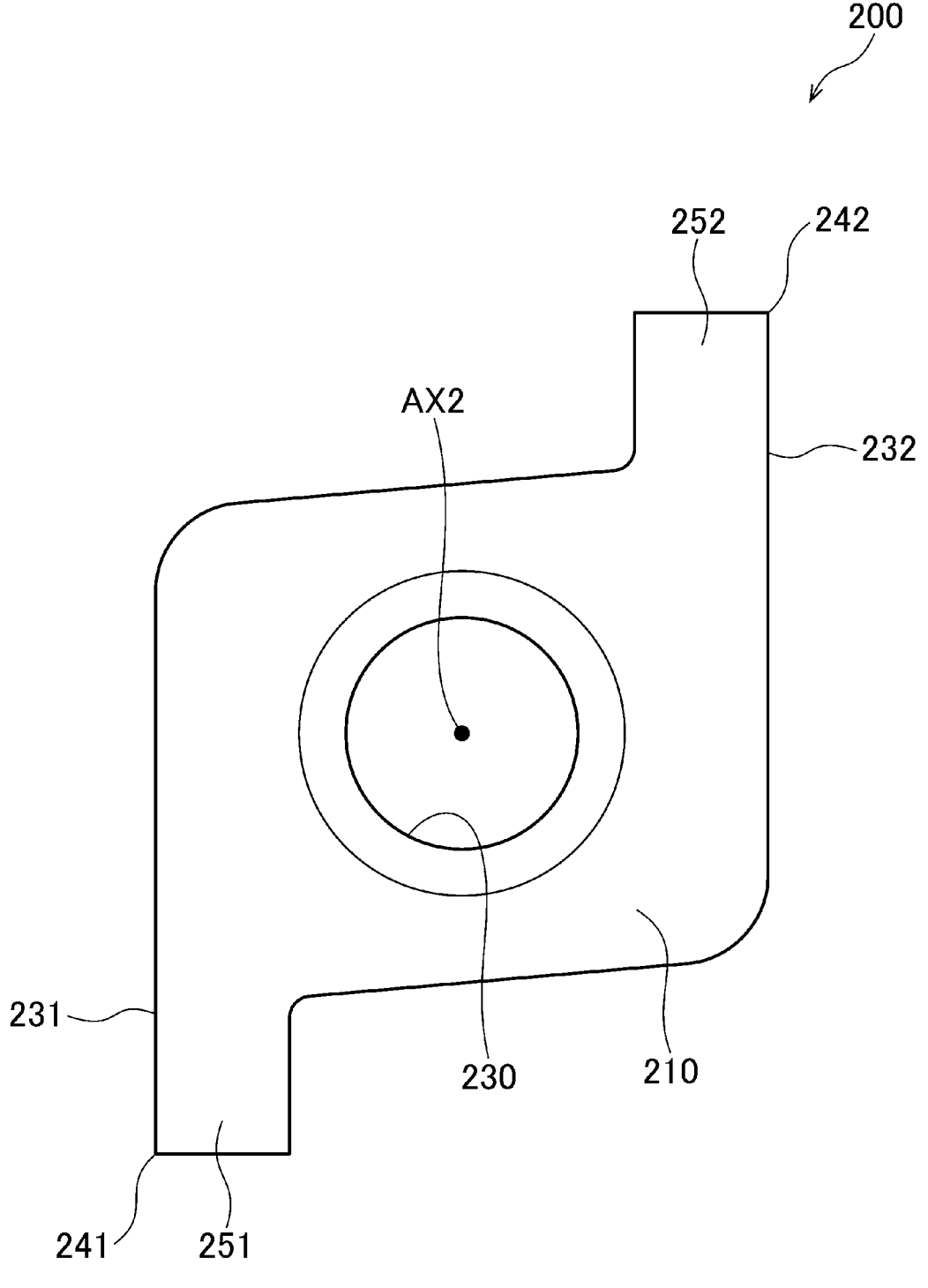
FIG. 8 is a diagram illustrating the configuration of a cutting insert included in the cutting tool illustrated in FIG. 7.

FIG. 7 illustrates the configuration of the cutting tool 10 according to a modification of the present embodiment. The configuration of the cutting tool 10 in the modification is substantially same as the configuration of the present embodiment except for the shape of the cutting insert 200. FIG. 8 schematically illustrates the shape of the cutting insert 200 in the modification.

As illustrated in FIG. 8, portions of the cutting insert 200 corresponding the corner cutting edges 241 and 242 in the modification protrude in directions in which the major cutting edges 231 and 232 are elongated, respectively. Among the protruding portions, a portion including the corner cutting edge 241 is also referred to as a "protrusion portion 251" in the following description. Among the protruding portions, a portion including the corner cutting edge 242 is also referred to as a "protrusion portion 252" in the following description.

As illustrated in FIG. 7, the protrusion portion 252 is entirely housed inside the clearance hole 170 in an attachment state in which the corner cutting edge 241 is used for cutting. On the other hand, the protrusion portion 251 is entirely housed inside the clearance hole 170 in an attachment state in which the corner cutting edge 242 is used for cutting.

In this manner, the protruding portions of the cutting insert 200 can be housed inside the clearance hole 170 in a case where the clearance hole 170 is formed such that the central axis AX3 is parallel to the second surface 220. This leads to an advantage that the shape of the cutting insert 200 has high freedom.

The shape of the clearance hole 170 may be a circular hole as described above but may be a hole of any other shape. The shape of the clearance hole 170 may be changed as appropriate in accordance with the shape of the corner cutting edge 242 or a portion in the vicinity thereof in the cutting insert 200.

The present embodiment has been described above with reference to specific examples. However, the present disclosure is not limited to these specific examples. Those obtained by changing designing of the specific examples as appropriate by the skilled person in the art are included in the scope of the present disclosure as long as they have features of the present disclosure. Each element included in each above-described specific example and, for example, the disposition, condition, and shape thereof are not limited to those exemplarily shown but may be changed as appropriate. Combination of elements included in the above-described specific examples may be changed as appropriate without technological inconsistency.

REFERENCE SIGNS LIST

10 cutting tool
20 fastening member
100 body
120 discharge groove
130 protrusion portion
140 bottom surface (insert seat)
170 clearance hole
200 cutting insert
210 first surface
220 second surface
230 through-hole
231, 232 major cutting edge
241, 242 corner cutting edge
AX1, AX2, AX3 central axis

What is claimed is:
1. A cutting tool comprising:
a body in which a discharge groove for guiding and discharging chips is formed so as to extend from a distal end side toward a proximal end side; and
a cutting insert fastened and fixed on the distal end side of the body, wherein
the cutting insert has
a first surface through which a through-hole for inserting a fastening member is opened,
a second surface that is opposite the first surface and contacts an insert seat of the body, and
a major cutting edge that is formed so as to extend straight at an end part of the first surface and at least part of which is used for cutting,
the cutting insert is fastened and fixed to the body by the fastening member such that the first surface faces inward of the discharge groove and the major cutting edge protrudes on the distal end side of a distal end of the body,
a protrusion portion protruding so as to cover part of the first surface of the cutting insert from outside is formed at the body,
the cutting insert includes
a first corner cutting edge connected to an outer periphery side end part of the major cutting edge, and
a second corner cutting edge positioned opposite the first corner cutting edge along a diagonal line of the first surface,
the second corner cutting edge is covered by the protrusion portion,
a clearance hole for preventing contact with the second corner cutting edge is formed in the body, and
the clearance hole is formed so as to extend from a surface of the body opposite the cutting insert toward the second corner cutting edge when viewed from the distal end side along a central axis of the body.
2. The cutting tool according to claim 1, wherein the major cutting edge extends from an outer periphery side of the body to a position over the central axis of the body when viewed along the central axis of the body.
3. The cutting tool according to claim 1, wherein the protrusion portion overlaps none of the major cutting edge and the through-hole when viewed along a central axis of the through-hole.

4. The cutting tool according to claim 1, wherein an angle between a central axis of the clearance hole and the central axis of the body is 90°±30°, and an angle between the central axis of the clearance hole and the second surface is 0°±30°.

* * * * *